A. H. G. FOKKER.
JOINT FOR AEROPLANE WINGS.
APPLICATION FILED FEB. 17, 1921.
1,396,177.
Patented Nov. 8, 1921.
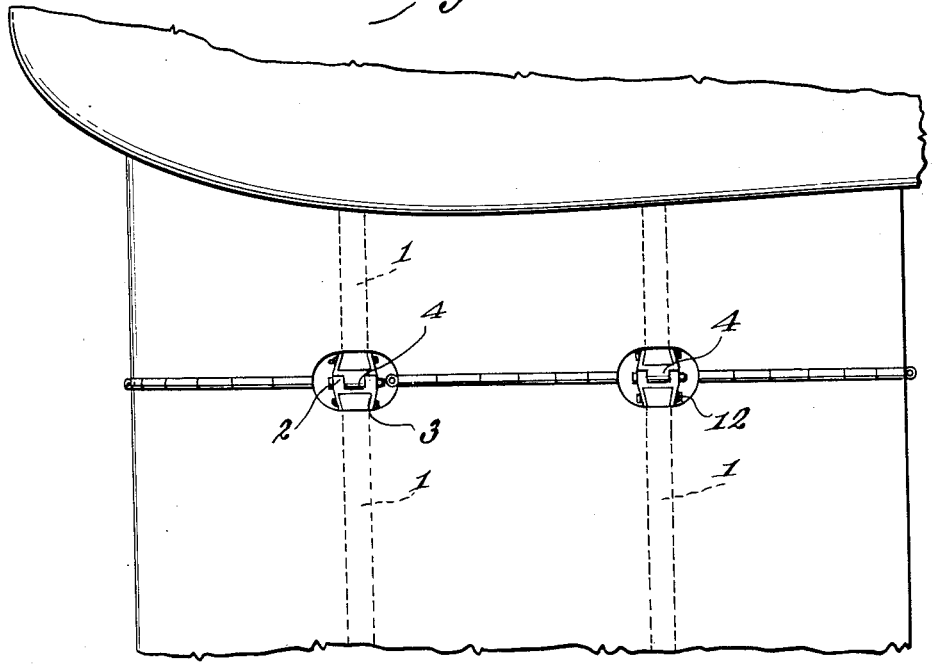
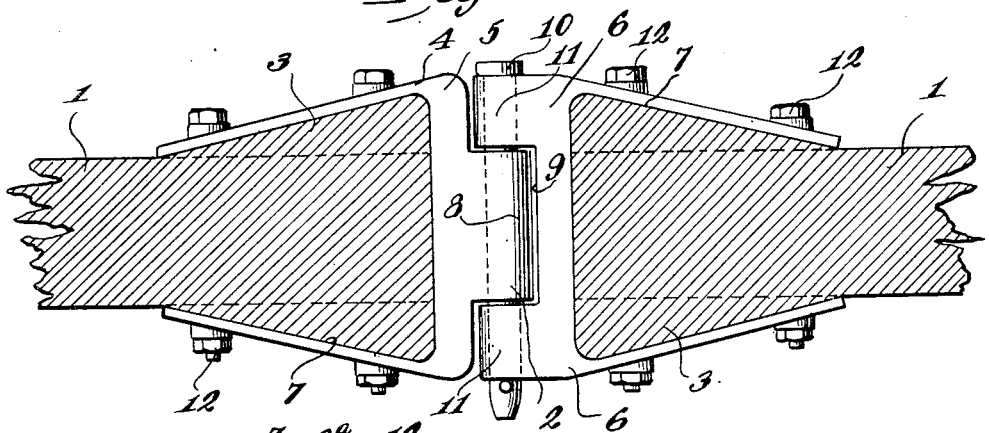
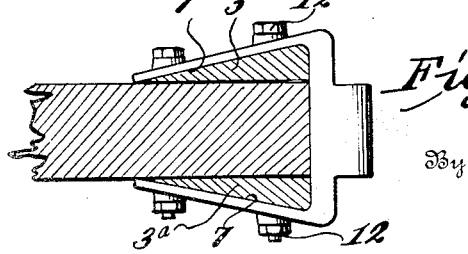

UNITED STATES PATENT OFFICE.

ANTHONY HERMAN GERARD FOKKER, OF AMSTERDAM, NETHERLANDS.

JOINT FOR AEROPLANE-WINGS.

1,396,177.   Specification of Letters Patent.   Patented Nov. 8, 1921.

Application filed February 17, 1921. Serial No. 445,733.

*To all whom it may concern:*

Be it known that I, ANTHONY HERMAN GERARD FOKKER, a subject of the Queen of the Netherlands, residing at Amsterdam, Netherlands, have invented a new and useful Joint for Aeroplane-Wings, of which the following is a specification.

This invention relates to improvements in joints for aeroplane wings. In the type of aeroplane supporting surface known as cantaliver or internally braced wings (*i. e.* supporting surfaces for planes in which the necessary strength is provided by the structure of the planes or of parts of the planes themselves, without exterior bracing or supports) and in which parts of said planes are so fixed to the other parts or to the structure of the body of the aeroplane that they may be readily detached, it has been found difficult to construct the joint between the said parts of sufficient strength and of sufficiently low weight to be efficiently used in an aeroplane.

In the type of plane construction where the strength of the structure is mainly provided by a beam or beams in the wing structure the joining of the detachable part of the planes to the other parts is of course carried out by joining the ends of the said beams to corresponding ends of beams or other parts of the remaining structure.

In cases where the actual means of providing the joint consists of metal parts fixed to the above mentioned beams, it has been found difficult to do so in the case of wooden beams, owing to the high tensile and compressive stresses to which the actual connection between the wood and metal parts is subjected in flight and in landing.

The object of my invention is to provide an improved joint in which the tension load tending to pull the metal part away from the wood, which usually is taken by the means of fixing the metal on the wood, *i. e.* the bolts through metal and wood and such like, is transferred to the outside of the wooden member.

This is effected by making the end of the wooden member substantially wedge or dovetail shape in section and surrounding it wholly or in part by the metal part, so that under tensile load a wedging action takes place, which prevents the metal part from slipping off the wooden member and relieves the fixing bolts (if any) from the load, as hereinafter described and claimed.

In the accompanying drawings:—

Figure 1 is a plan of a portion of an aeroplane wing provided with joints in accordance with my invention.

Fig. 2 is a detail sectional view of the same on a larger plane, extending across one of the joints.

Fig. 3 is a detail section of one of the beams, showing a modification.

In accordance with my invention the opposed ends of the wooden beams or beam sections 1 of the aeroplane wing between which a joint 2 is formed, are provided on opposite sides with wedge-shaped enlargements or shoulders 3 which may be integral therewith as shown in Fig. 2, or may be formed separately therefrom and secured thereto as by means of glue or other suitable means, as indicated at 3ª in the modification of the invention shown in Fig. 3.

The coupling devices 4 which are made of steel or other suitable metal, are each composed of a pair of members 5, 6, each of which members has a wedge-shaped recess 7 to receive one end of the beam 1. The said member 5 also has a projection 8 which enters a recess 9 in the member 6, and the said members are detachably secured together by a bolt or pin 10 which is inserted in corresponding openings in the shoulders 11 of the member 6 and the projection 8 of the member 5. Bolts or other suitable clamping devices 12 pass through the sides of the coupling members 4 and the said widened ends of the beams or beam sections 1, as shown.

Owing to the wedge or dovetail shape of the ends of the wooden member and the corresponding shape of the recesses of the metal coupling member, the latter is effectually prevented from pulling or slipping off from the wooden member or beam under tensile load or stress, owing to the resulting wedging action, and moreover, the fixing bolts 12 are entirely relieved of such stress.

While I have herein shown and described a preferred form of my invention, I would have it understood that changes may be made in the form, proportion and construction of the several parts, without departing from the spirit of my invention, and within the scope of the appended claims.

What I claim is:—

1. In an aeroplane wing joint, a wooden member having wedge-shaped contiguous ends, and a metallic coupling device between said ends of said wooden member and having wedge-shaped recesses in which said ends are fitted.

2. In an aeroplane wing joint, a wooden member having wedge-shaped contiguous ends, and a metallic coupling device between said ends of said wooden member and having wedge-shaped recesses in which said ends are fitted, said coupling device comprising a pair of members detachably connected together.

3. In an aeroplane wing joint, a beam member having contiguous ends, and a coupling member arranged between said ends, said members, having wedge-acting coengaging surfaces which resist tensile stress and prevent said members from parting under such stress.

In testimony whereof I affix my signature in presence of two witnesses.

ANTHONY HERMAN GERARD FOKKER.

Witnesses:
ROB. C. MOODEY,
F. CUMER.